P. M. FREER.
INTERNAL COMBUSTION ENGINE.
APPLICATION FILED MAY 5, 1916.

1,331,749.

Patented Feb. 24, 1920.
6 SHEETS—SHEET 1.

Inventor
Phelps M. Freer
by Thurston & Kwis
Attys.

P. M. FREER.
INTERNAL COMBUSTION ENGINE.
APPLICATION FILED MAY 5, 1916.

1,331,749.

Patented Feb. 24, 1920.
6 SHEETS—SHEET 2.

Inventor
Phelps M Freer
by Thurston & King
Attys.

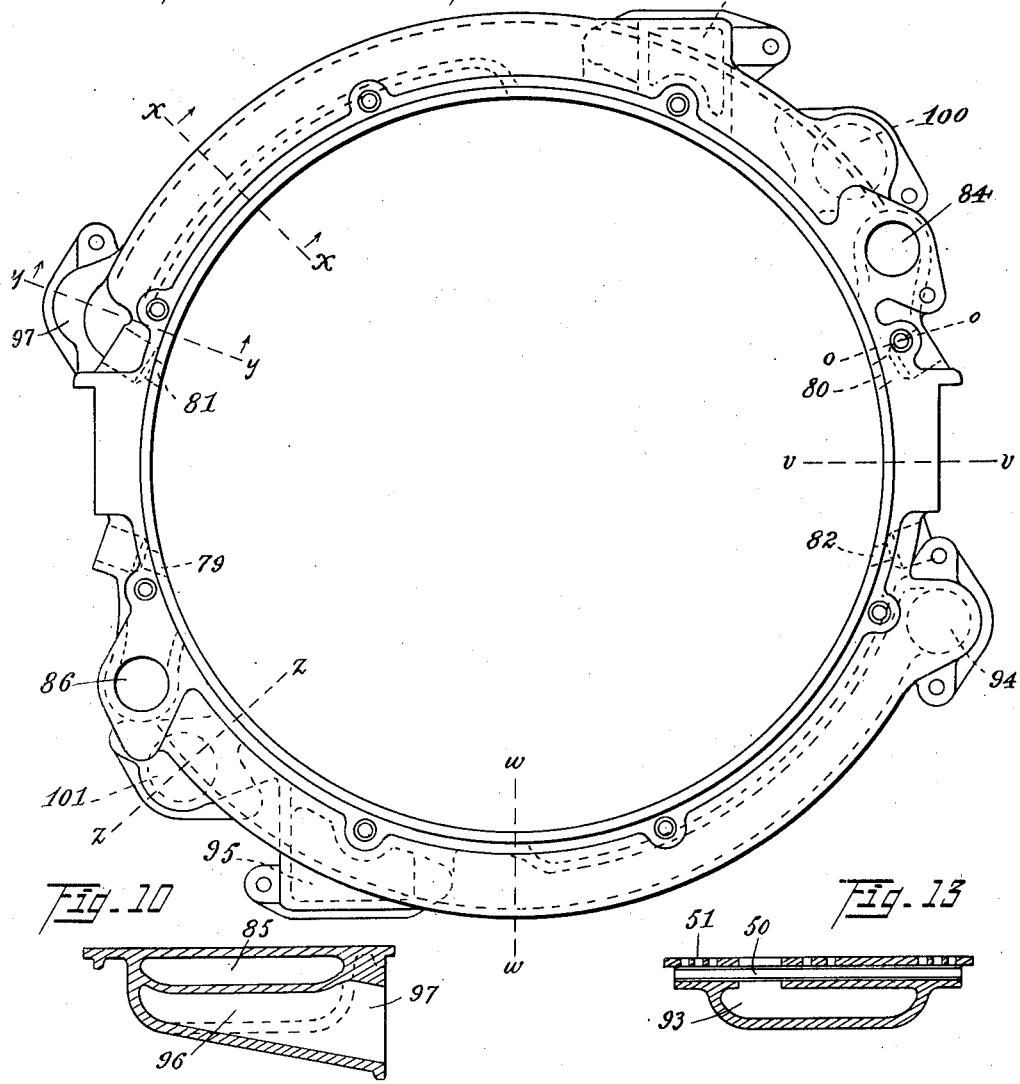

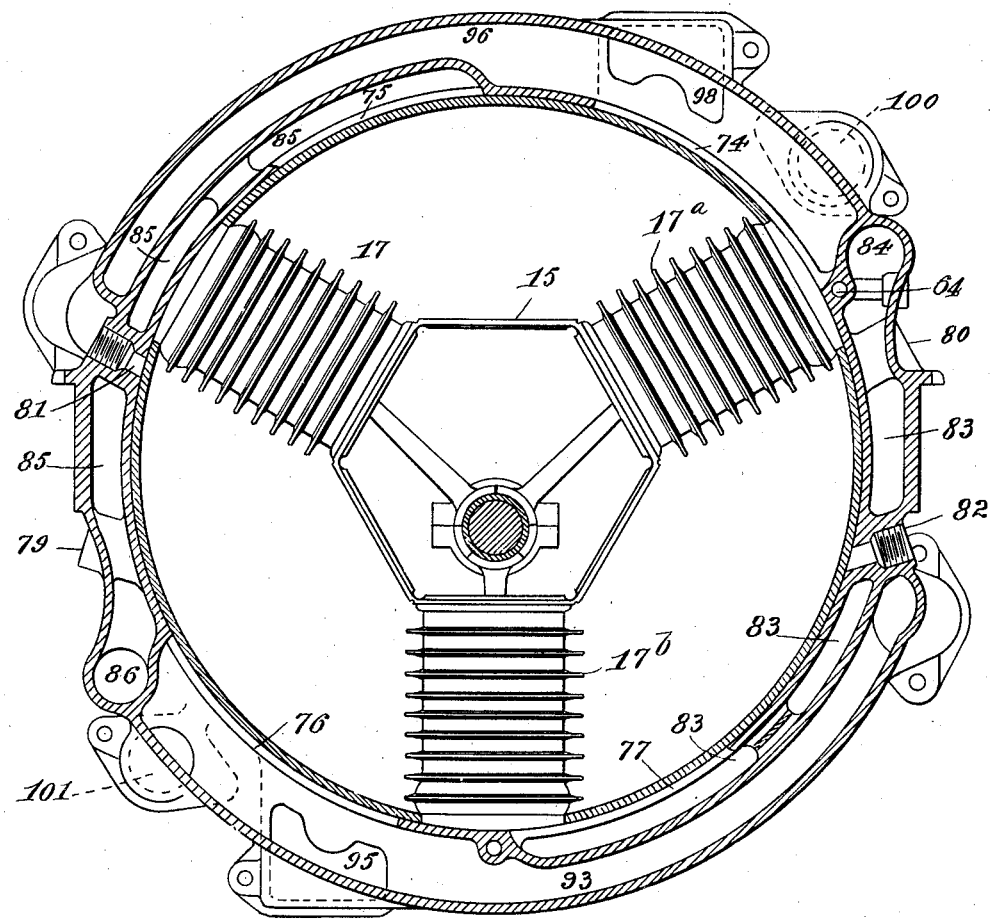

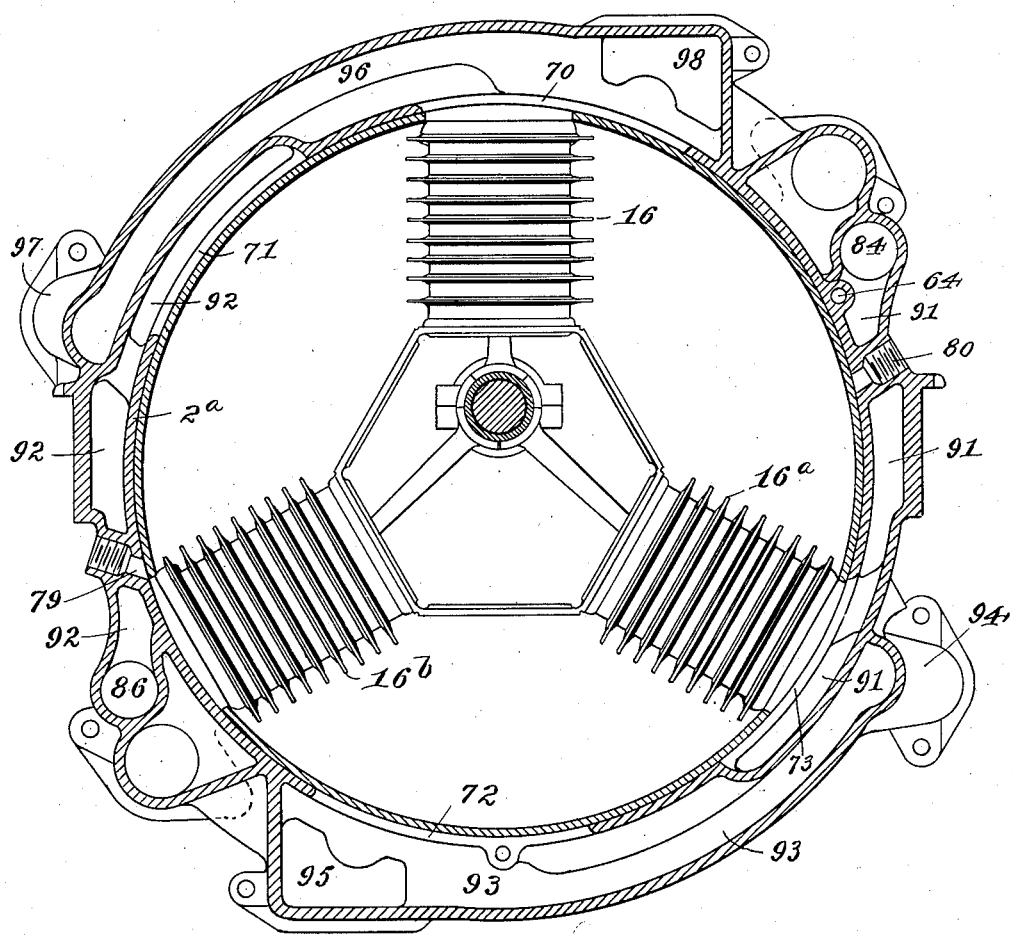
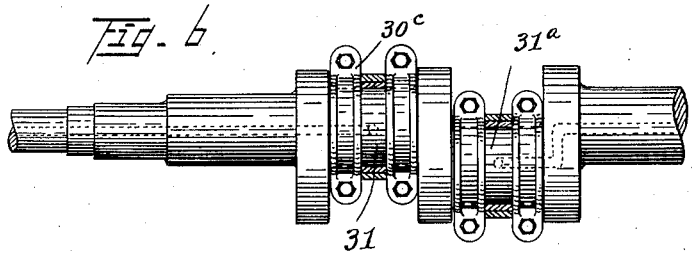

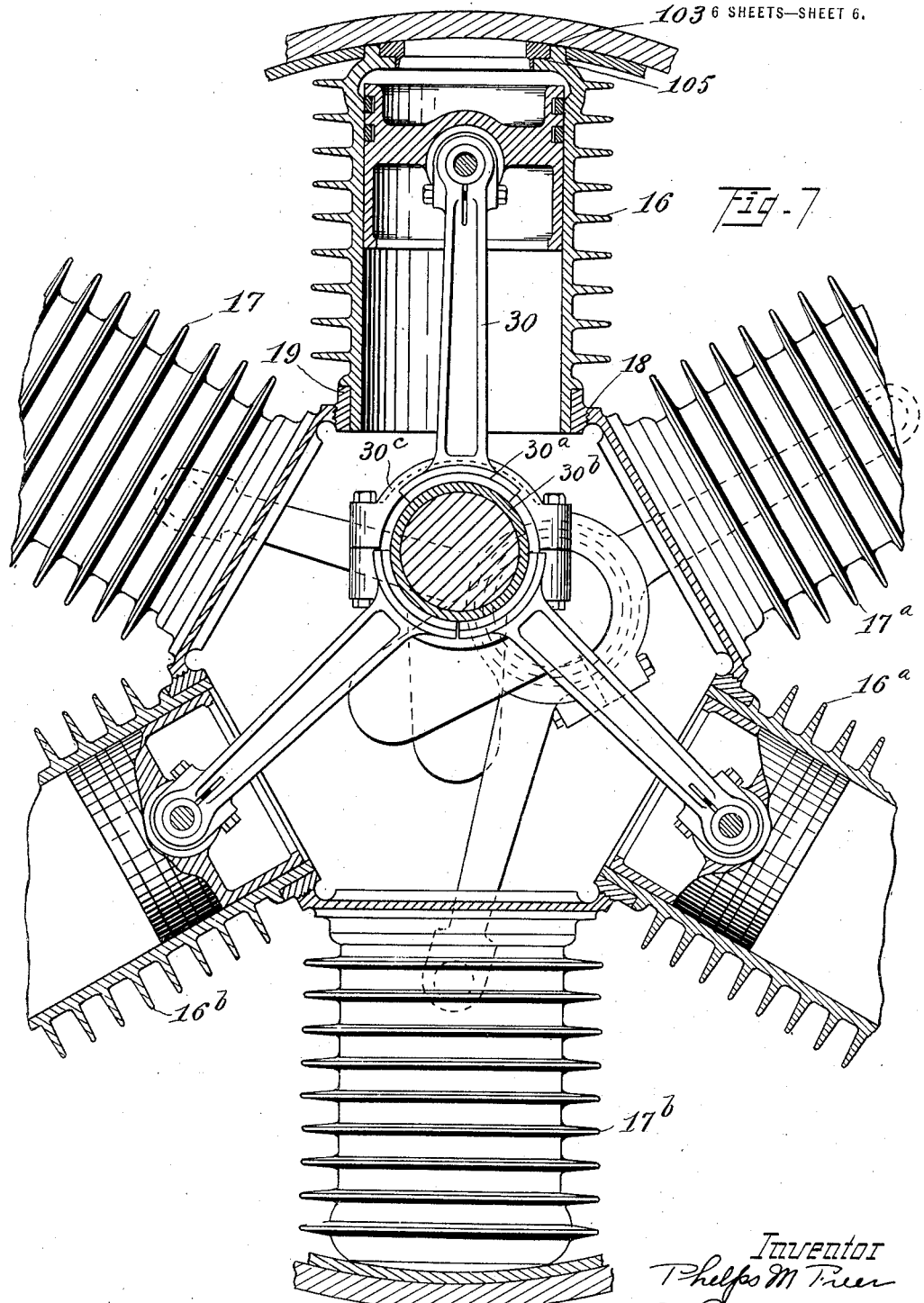

UNITED STATES PATENT OFFICE.

PHELPS M. FREER, OF DETROIT, MICHIGAN.

INTERNAL-COMBUSTION ENGINE.

1,331,749.   Specification of Letters Patent.   Patented Feb. 24, 1920.

Application filed May 5, 1916. Serial No. 95,540.

*To all whom it may concern:*

Be it known that I, PHELPS M. FREER, a citizen of the United States, residing at Detroit, in the county of Wayne and State of Michigan, have invented a certain new and useful Improvement in Internal-Combustion Engines, of which the following is a full, clear, and exact description.

This invention relates to an internal combustion engine of the type wherein the cylinders which carry the reciprocating pistons rotate.

The object of the invention is to provide such an internal combustion engine wherein a plurality of cylinders are employed and so arranged that a number of impulses are imparted to the crank shaft during each revolution of the cylinders. Other objects will appear as a description of the invention proceeds.

Generally speaking, the invention may be said to comprise elements and combination thereof set forth in the accompanying claims.

Figure 1:
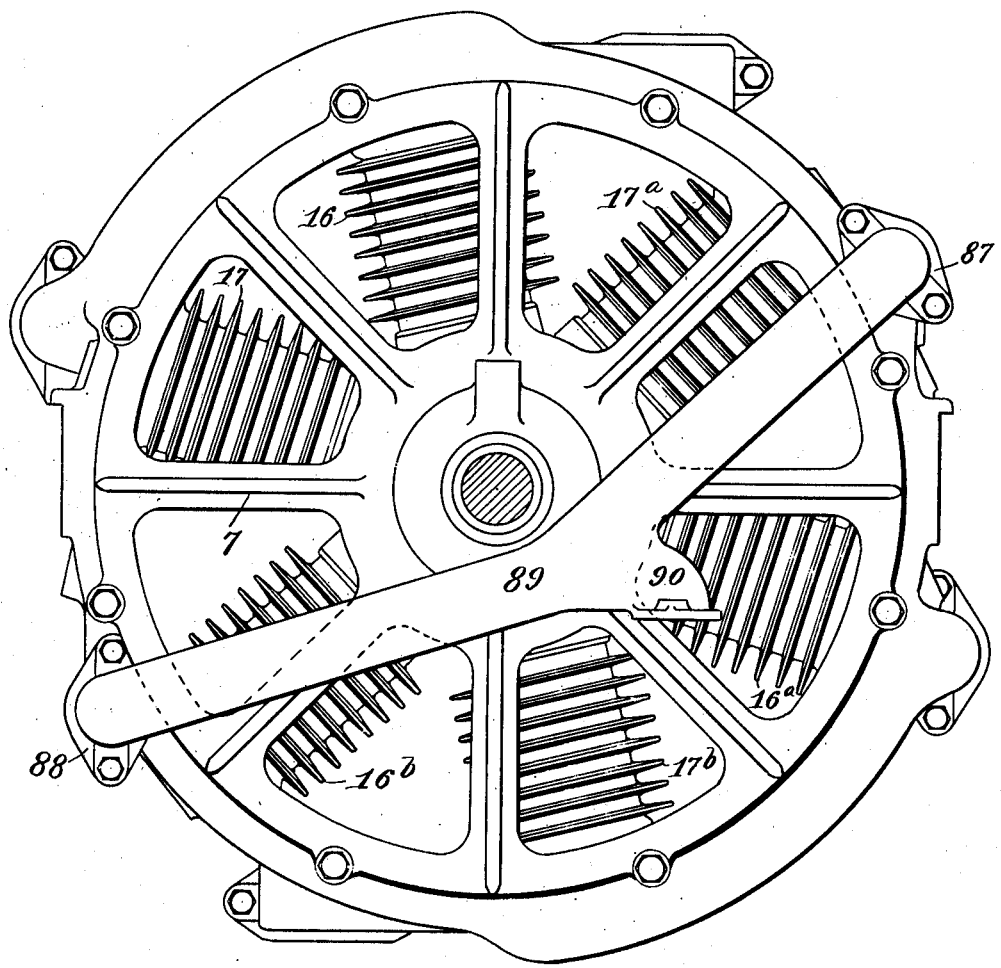
Figure 8:
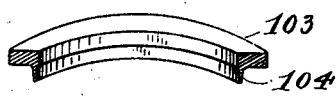
Figure 2:
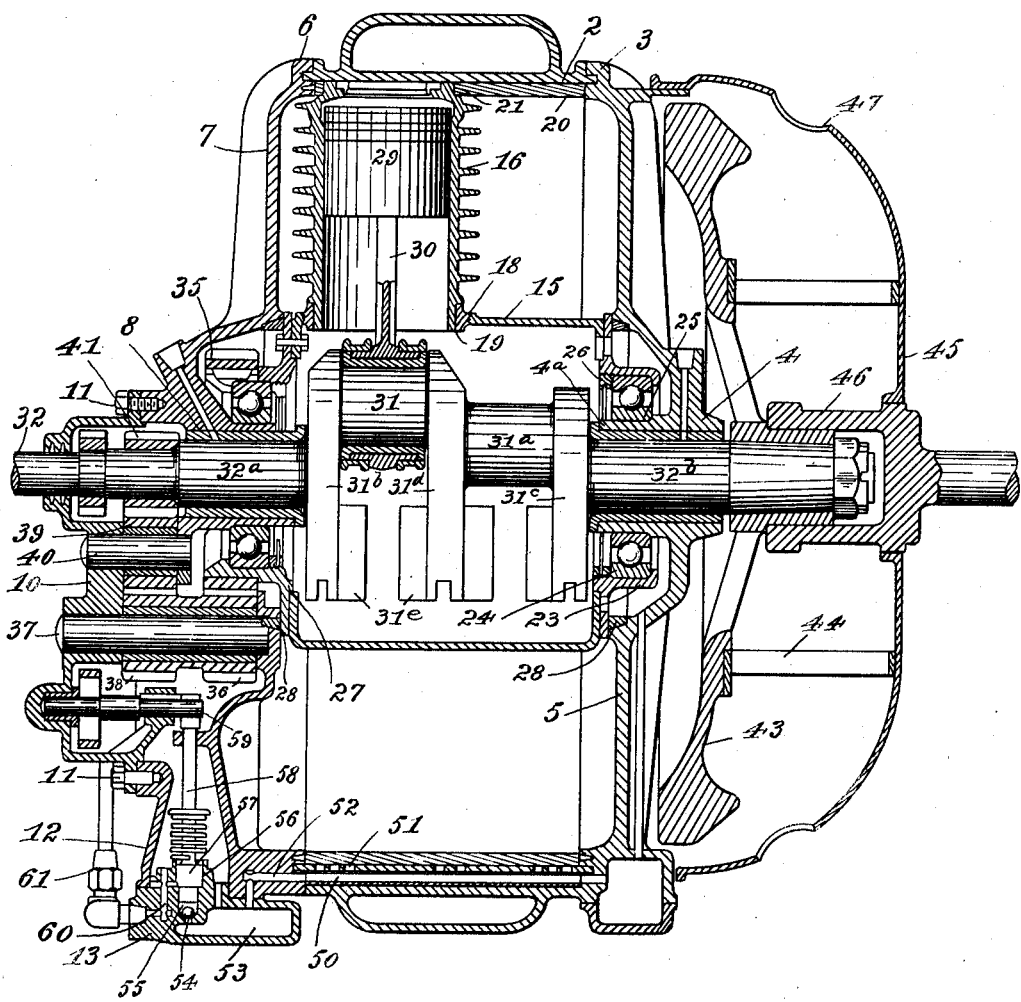

Reference should be had to the accompanying drawings forming a part of this specification, in which Figure 1 is a side elevation of the engine; Fig. 2 is a sectional elevation of the engine; Fig. 3 is a side elevation of a portion of the engine; Fig. 4 is a sectional elevation of the engine; Fig. 5 is another sectional elevation of the engine; Fig. 6 is an elevation partly in section of the crank shaft; Fig. 7 is an elevation with portions in section showing on an enlarged scale the arrangement of the cylinders, piston rods and crank shaft; Fig. 8 is a perspective view of a portion of the cylinder packing ring; Fig. 9 is a section on the line X—X of Fig. 3; Fig. 10 is a section on the line Y—Y of Fig. 3; Fig. 11 is a section on the line Z—Z of Fig. 3; Fig. 12 is a section on the line V—V of Fig. 3; Fig. 13 is a section on the line W—W of Fig. 3; Fig. 14 is a section on the line O—O of Fig. 3.

The engine forming the subject matter of this invention comprises a stator member and a rotor member. The stator member may be mounted upon some suitable base which is not here shown, as it forms no part of the invention. A rotor is mounted within the stator, the stator being constructed in a suitable manner to permit the rotor to rotate within it. In the type of engine here shown an internal wall of the stator forms a closure for the ends of the cylinders and the stator is provided with suitable passageways which conduct the fluid fuel to the cylinders at proper times and conduct away the exhausted gases at proper intervals.

The stator member is made up of an annular portion 2, the inner side of which forms a cylindrical surface. This is the surface with which the outer end of the cylinders coöperate. This member 2 coöperates with a member 3 to which it fits and is secured, the member 3 comprising an annular portion which coöperates with the annular member 2 and a central hub portion 4 which is connected by suitable spokes 5 to the part 3. The hub portion 4 forms a bearing for one part of the crank shaft, and upon the outer surface of the part 4 one part of the rotor is rotatably mounted. For this purpose, the portion 4 is provided with an inwardly extending sleeve $4^a$.

Upon the other side of the member 2 there is a side member provided with an annular portion 6 which coöperates with the annular member 2. The annular member 6 is joined to the central portion of this side member by spokes 7. The central portion of the side member just mentioned is formed with a bearing portion as indicated at 8, through which bearing portion the crank shaft extends and has a bearing seat. The portion 8 is formed with an inwardly extending sleeve, upon the outer portion of which part of the rotor is mounted, so that it may rotate.

Coöperating with the central portion of the side member is a cover portion 10, this cover portion being secured to the central portion in any suitable manner, as by bolts 11.

At the lower portion of the side member there is a fitting 12, which forms a part of the side member, this fitting forming with the lower portion of the side member a chamber, the purpose of which will be later described. Coöperating with the fitting 12 and the side member is member 13 which forms a part of the lubricating system for the engine, as will be later described.

Within the stator is mounted the rotor which comprises a central member indicated at 15. This member is formed with six sides, as will be seen from an inspection of Figs. 4 and 5. In this member are mounted the cylinders. There are two sets of cylinders, three cylinders forming a set. The three pistons forming one set are staggered with respect to the three pistons forming the other set, and each set of pistons lies in a different plane.

As will be seen in Fig. 1, the cylinders are so arranged that the axis of each cylinder is angularly displaced 60° with respect to each adjacent cylinder. The cylinders in each group are displaced angularly with respect to each other 120°. The cylinders of one group are indicated at 16, 16$^a$, and 16$^b$, while the cylinders of the other group are indicated at 17, 17$^a$, and 17$^b$. Each of the cylinders is secured in an opening formed in the member 15. This opening for the cylinder 16 is indicated at 18 in Fig. 2, the cylinder 16 being formed with the recess portion adjacent the inner part of the cylinder which coöperates with a collar 19, which in turn is threaded into the opening 18 of the cylinder 15. Each of the cylinders coöperates with the member 15 in a manner similar to that just described.

Coöperating with the inner surface of the member 2 is a cylindrical member 20. This member forms a nice fit within the member 2 and is provided with openings into which extend the outer end of each cylinder, as indicated in Fig. 2. The cylinder 16 is provided with an outwardly extending portion 21 which fits within an opening formed in the member 2. This member 2 forms a closure for the intake and outlet ports which are arranged upon the inner surface of the member 2, except at such times as when in the course of rotation of the cylinders, the various cylinders are brought into juxtaposition with the said inlet and outlet ports.

At one end of the member 15 there is secured a member 23 which houses an outer ring 24 of a ball bearing. The inner ring is shown at 25 and rests upon the sleeve 4$^a$ which forms a part of the central portion 4 of one end of the stator. The bearing rings are held in place by a suitable ring 26, which is threaded within the member 23.

At the opposite end, the stator is provided with a member 27 which receives the outer ring of a ball bearing, the inner ring of which is carried upon the inwardly extending sleeve of the part 8, as indicated in Fig. 2. It will thus be seen that the opposite ends of the rotor are mounted upon the stator and not upon the crank shaft. Between the members 27 and 23 of the rotor and the parts of the stator which are adjacent thereto, there are suitable packing rings, such as indicated at 28 and shown in Fig. 2.

Each of the cylinders has a suitable piston operating therein and is shown in Fig. 2 and the piston for cylinder 16 as indicated at 29. This piston coöperates with a piston rod 30 which in turn coöperates with the crank pin 31 of a crank shaft generally represented at 32.

The crank shaft 32 has two bearing portions 32$^a$ and 32$^b$ which coöperate with the sleeve like portions of the parts 4 and 8 of the stator. It will thus be seen that the crank shaft is mounted for rotation independently of the rotor.

The rotor and crank shaft are connected by suitable gearing. This is shown in Fig. 2 and it will be seen that there is a gear 35 which is mounted upon the rotor. This gear is mounted upon the member 27. This gear coöperates with a gear 36 carried upon a shaft 37 that finds bearing at one end of the stator and at its opposite end in the cover 10. Upon this shaft, there is a gear 38 and in the instance shown, the two gears are formed on a common hub. The gear 38 meshes with a gear 39, which is carried upon a short shaft 40, this shaft finding bearing at one end in a portion of the end of the stator. The gear 39 meshes with a gear 41 which is carried upon the crank shaft 32 and is secured thereto. The gears forming this train of gearing are so proportioned that the crank shaft makes three revolutions for every complete revolution of the stator.

Upon the crank shaft 32, there is mounted fly-wheel 43, the peripheral portion of the fly-wheel being secured to the central hub portion which is carried upon the shaft 32 by means of spokes that are spaced apart.

Upon the upper part of the fly-wheel there are fan blades which are generally represented at 44. There is a casing 45 which incloses the fly-wheel, this casing having a central sleeve portion 46, which sleeves over a portion of the hub of the fly-wheel. The casing completely incloses the fly-wheel and at its outer edge coöperates with the stator. The casing 45 is provided with a number of openings such as indicated at 47. The action of the fans carried by the fly-wheel is to draw air through the stator and around the cylinders forming the rotor and expels the same through the openings in the casing 45. In this way the engine is cooled.

At the lower part of the stator there extends transversely of the central portion of the stator, a tube 50. This tube is provided with openings, which communicate with openings 51 formed in the stator and these openings in turn connect with the inner surface of the stator and convey excess lubricant from the engaging surface of the stator and rotor. The pipe 50 communicates with a channel 52, which in turn communicates with a chamber 53 formed in the member 13.

Communicating with the chamber 53 is a port 54 which opens into a chamber 55. This chamber is enlarged at its upper portion as indicated at 56, the chambers 55 and 56 receiving a double headed piston 57. This piston has a rod 58 which is mounted upon a shaft 59, the shaft 59 being driven from the moving part of the engine. The portion 56 communicates with a passage way 60 which in turn communicates with a pipe 61 that leads to a source of lubricating fluid which is not shown.

The engaging surfaces of the stator and the cylindrical member 20 are supplied with lubricant by means of a tube shown at 62 in Fig. 15. This tube extends transversely of the stator through the opening indicated at 64 in Figs. 4 and 5. The tube 62 by means of small openings 65 communicates with the inner surface of the stator and supplies lubricant thereto in desired quantities. The tube 62 may be supplied from any desired source of lubricant.

The small openings 65 formed in the inner wall of the stator are arranged in groups, which groups are so placed that they do not open into the tops of the cylinders as they rotate.

The same is true of the openings 51 which communicate with the pipe 50 as shown in Fig. 13. These latter openings 51 collect the excess oil as it flows and it gathers in the pipe 50 from whence it flows into the chamber 53 and then it is taken by the pumping mechanism illustrated in Fig. 2 and pumped to the desired storage source.

The crank shaft 32 is provided with two crank pins, one of which has been designated at 31 and the other of which is designated at 31ª. The crank pin 31 is joined to the crank shaft by means of an arm 31ᶜ. The crank pins are joined to each other by means of an arm 31ᵈ. The crank pins are displaced angularly with respect to each other and the angular distance between the wrist pins being substantially 60 degrees, as will be seen from an inspection of Fig. 7. The arms 31ᵇ and 31ᶜ are adapted to carry counterweights such as indicated at 31ᵉ for the purpose of counterbalancing the crank pins and the arms themselves.

Each of the piston rods taking as a sample that represented at 30 and referring more especially to Fig. 7, is provided with a metal bearing portion 30ª. This engages with a bushing 30ᵇ, which is free to turn upon the crank. The angular length of the portion 30ª is substantially 88 degrees and each of the other piston rods are similarly formed. This construction allows relative movement between the shoulder portions 30ª of each of the piston rods as they move relatively to each other during the operation of the engine. The particular angular length of part 30ª as given is not essential but by way of illustration only.

The portions 30ª extend on both sides beneath retaining rings which are generally represented at 30ᶜ, these retaining rings being split and secured together as indicated in Fig. 6.

It will be understood that the piston rods which coöperate with the crank pin 31ª are similarly formed and operate in a similar manner.

The inner wall of the stator is provided with inlet ports and with exhaust ports and there are two sets of such ports, one of the sets coöperating with the cylinders 16, 16ª and 16ᵇ, while the other set of ports coöperate with the cylinders 17, 17ª and 17ᵇ. The ports of each set are symmetrically arranged and the ports of the two sets are staggered with respect to each other.

All the ports are elongated so that as each cylinder coöperates with each port in turn, its communication with each port is prolonged sufficiently to enable its functioning, either when exhausting or intaking, to be completed.

In Fig. 5, such a section is taken through the stator as shows the ports with which the cylinders 16, 16ª and 16ᵇ in turn coöperate. The port 70 is an outlet port; the port 71 is an inlet port; the port 72 is an exhaust port and the port 73 is an intake port. Similarly on Fig. 4 the port 74 is an exhaust port; port 75 is an inlet port; port 76 is an exhaust port and port 77 is an inlet port. It will thus be seen that each cylinder in the course of a single revolution coöperates with two inlet ports and two outlet ports.

Thus again referring to Fig. 5, the cylinder 16 is shown in the position opposite the exhaust 70 and, of course, the products of combustion would pass from the cylinder through the port 70 during such time as in the revolution of the cylinder 16, the cylinder is in contact with the port 70. In this position, the piston rod of the cylinder is in its outermost position, thus expelling the products of combustion through the port 70. As the piston moves in the direction of the arrow, it will next come opposite the port 71 which is an intake port. As the cylinder is thus moving the piston is beginning to reciprocate inwardly so that as the cylinder moves past the port 71, the piston moves into its innermost position and as the piston moves just beyond the port 71, the charge is compressed, for at that time, the end of the cylinder 16 is closed by the portion 2ª on the inner wall of the stator. The gaseous fuel is compressed during its passage from the end of the port 71 to the spark plug, the position of which is indicated by the threaded receiving hole indicated at 79. At this point the charge is fired and the expansion of the gas takes place, while the cylinder is passing from the spark plug 79 to the beginning of the opening of the port 72. The charge of the cylinder will be exhausted through the port 72 and from thence the cylinder passes to the port 73 where a fresh charge of fuel is drawn in by the piston as it moves toward the inner end of the cylinder. The charge in the cylinder is compressed during the passage of the cylinder between the end of the port 73 and a spark plug, the position of which is indicated at 80. At the point 80, the charge is fired and the gas expands within the cylinder pushing the piston therein toward the inner end of the cylinder until the cylinder begins to communicate a second time with the port 70, at which point it exhausts.

When the cylinder 16 is about completing its exhausting the cylinder 16ᵃ is receiving a charge, and cylinder 16ᵇ has been fired, its charge of fuel is expanded.

In the next 60° of angular movement, cylinder 16 will come opposite intake port 71, cylinder 16ᵃ will be opposite a spark plug located at 80° and the charge fired, and cylinder 16ᵇ will come opposite exhaust port 72. In the next 60° of revolution, cylinder 16 will be opposite a spark plug located at 79, where its charge will be fired, cylinder 16ᵃ will have moved to a position opposite discharge port 70, and cylinder 16ᵇ will be opposite intake port 71, and cylinder 16ᵇ will be opposite intake port 73. In the next 60° of revolution cylinder 16 will come opposite exhaust port 72, cylinder 16ᵃ will come opposite intake port 71 and cylinder 16ᵇ will be opposite a spark plug located at 80 where its charge will be fired. The remaining movements to complete a revolution of the cylinders 16, 16ᵃ, 16ᵇ, from and back to the position shown in Fig. 5 will be readily understood.

Each of the three cylinders of the group 16, 16ᵃ and 16ᵇ will thus fire twice in a single revolution.

It will be seen that one of the cylinders in the group just mentioned will fire every 60° of revolution, or there will be six impulses given the crank shaft in a complete revolution of the cylinders.

The cylinders 17, 17ᵃ and 17ᵇ will operate in precisely the same manner as the group of cylinders just described, and will also impart six impulses to the crank shaft in a revolution of the stator.

This group of cylinders will coöperate with spark plugs located in openings 81 and 82 which plugs are spaced 30° from the spark plug openings 79 and 80. It will be also noted that the various intake and exhaust ports which coöperate with this group of cylinders are displaced 30° with respect to the similar exhaust and intake openings which coöperate with the cylinders 16, 16ᵃ and 16ᵇ.

The cylinders of the two groups are staggered and are spaced apart 60° from each other. Therefore, when the cylinders of each group will give an impulse to the crank shaft every 60° of revolution of the rotor, the two sets of cylinders, their spark plugs, and exhaust and intake ports being arranged as before stated, will result in giving an impulse to the crank shaft every 30° of revolution of the rotor, or 12 impulses for every revolution of the rotor.

The order of firing of the cylinders is as follows: We will assume that the cylinder 17 will first fire, then next the cylinder 16ᵃ will fire, then the cylinder 17ᵇ, then the cylinder 16, then the cylinder 17ᵃ, and then the cylinder 16ᵇ.

Thus in this engine having six cylinders the same effect is obtained so far as impulses delivered to the crank shaft is concerned, as with the usual 8 cylinder 4 cycle engine.

The central portion 2 of the stator is provided with passage ways which communicate with the various ports which have been mentioned. Turning to Fig. 4, the passage way 77 communicates with a passageway 83, which passage way in turn communicates with an opening 84. The port 75 communicates with a passage way 85, which in turn communicates with an intake 86. These intakes 84 and 86 open in the form of heads 87 and 88, which may be separately supplied with fuel or they may receive the ends of a manifold 89, which is provided with a portion 90 that is connected to a suitable source of gasified fuel such as a carbureter or other fuel gasifying device.

The port 73 of Fig. 5 communicates with a passage way 91, which is in reality a part of the passage way 83, the difference merely being that the port 73 is displaced angularly with respect to the port 77, and, of course, the two ports are not in line with each other, inasmuch as one communicates with one set of cylinders, while the other communicates with the other set of cylinders.

Similarly the port 71 coöperates with the passage way 92 which is a part of passage way 85.

The outlet port 72 communicates with a passage way 93. This passage way is walled from the intake passage and lies upon the outside thereof. The passage way 93 connects with two outlet openings, one indicated at 94 and the other indicated at 95. The opening 95 is nearest the exhaust port 72 and consequently the shortest passage for the gas is through the exhaust port 95. However, the opening 95 may be closed to a certain extent, so as to divert a portion of the products of combustion through the passage way 93 and to the exhaust opening 95. This will cause a portion of the heated products of combustion to pass in contact with the walls of the intake passage ways 91 and 77; thus in a measure heating the fluid fuel and transferring a portion of the heat from the hotter part of the walls of the engine to the walls of the stator which are cooler, thus tending to maintain an even heating of the walls of the stator and to prevent unequal expansion.

Similarly the outlet port 70 communicates with a passage way 96, which terminates in an exhaust opening 97, and there is also an exhaust opening 98, which is adjacent the port 70. Regulation of the size of the opening 98 will divert a desired amount of the heated products of combustion through the passage way 96, thus imparting heat to the walls of the passage way which conducts the incoming fuel.

The port 74 communicates with the opening 98 and with a second opening 100 and also communicates with the passage way 96. The products of combustion are thus in part directed through the opening 100 which brings the heated gases in communication with the wall of the intake portion 84. Similarly the exhaust port 76 communicates with the exhaust opening 95 and with a second exhaust opening 101, as well as with the port 93. The products of combustion passing through the opening 101 will be caused to pass into contact with the walls of the intake portion 86.

At the outer end of each of the pistons there is a packing ring such as illustrated in Fig. 8 and which is shown in its position at 103 in Fig. 7. The packing ring is formed with a top portion and a depending flange 104, this flange being offset slightly from the inner periphery of the ring. The top portion 103 is machined to fit within a groove 105 formed in the outer end of the cylinder.

In assembling, the ring is placed within the cylinder at the head, and then the top of the cylinder and the top of the ring are machined, so as to fit the inner wall of the stator. Obviously the cylinder and ring can be separately machined and subsequently assembled.

The particular form of ring has been found to possess great advantage in that it produces a minimum amount of wear upon the stator. In action, the gases within the cylinder bear upon the slight ledge between the flange 104 and the top of the ring and the pressure exerted by the gases upon the ring as thus described will be in an outward direction.

There will be a layer of oil between the surface of the stator and the outer surface of the ring. Atmospheric pressure acts on this oil film and will normally be pressing the ring inwardly. The outer surface of the ring may be so proportioned to that part of the ring which overhangs the depending flange 104 that the atmospheric pressure exerted upon the oil film will be sufficient to prevent the escape of gas from the cylinder.

In the operation of the engine the ring becomes heated and the tapered flange expands against the ledge of the cylinder upon which it is seated. This helps to counteract the outward thrust of the ring against the stator wall, and also assists in holding the gas from escaping around the ring.

The construction just explained seems to hold the packing ring in what may be termed a floating or balanced condition, at least the ring does not press against the inner wall of the stator with any great amount of friction, and will only produce a minimum amount of wear, at the same time preventing any leakage of gas around the ring.

Having thus described my invention, what I claim is:—

1. An internal combustion engine comprising a stator and a rotor, said rotor being formed with two sets of ports, there being plurality of intake and exhaust in each set, two sets of cylinders carried by the stator, each of said sets of cylinders comprising three cylinders which are spaced angularly a distance of 120° from each other, the cylinders of the two sets being staggered to each other so that the cylinders are placed angularly and are a distance of 60° from each other, piston and piston rods associated with the cylinders, a crank shaft with which the said cylinders coöperate, the cylinders coöperating with the said ports, so that each cylinder is fired a plurality of times during a revolution and the cylinders in the two sets fire alternately.

2. An internal combustion engine comprising a stator and a rotor, the said stator being formed with two sets of ports, each set of ports comprising a plurality of intake and exhaust ports, the ports of each set being staggered with respect to each other, two sets of cylinders carried by the rotor, each set of cylinders comprising three cylinders, which are angularly spaced from each other 120°, each cylinder of the two sets being staggered with respect to each other so that the cylinders are in effect angularly spaced at 60° from each other, a crank shaft having two crank pins, the crank pins being angularly spaced from each other a distance of 60°, piston and piston rods of each set of cylinders coöperating with one of the crank pins, each of the cylinders in each set coöperating with the intake and exhaust ports successively, to be fired a plurality of times during a revolution, the cylinders in the two sets firing alternately.

3. An internal combustion engine comprising a stator, two sets of cylinders each set of cylinders comprising three cylinders which are angularly spaced from each other 120°, the cylinders of the two sets being staggered with respect to each other so that the cylinders are in effect angularly spaced a distance of 60° from each other, two sets of ports formed in the stator, each of said sets of ports comprising two intake and two exhaust ports the intake and exhaust ports being arranged in succession, ignition means arranged between each intake port and exhaust port, the ports in one set being angularly spaced a distance of 30° with respect to the similar ports in the other set, pistons and piston rods associated with the cylinders, a crank shaft with which said piston rods coöperate.

4. An internal combustion engine comprising a stator, two sets of cylinders each set of cylinders comprising three cylinders which are angularly spaced from each other 120°, the cylinders of the two sets being staggered with respect to each other so that the cylinders are in effect angularly spaced a distance of 60° from each other, two sets of ports formed in the stator, each of said sets of ports comprising two intake and two exhaust ports the intake and exhaust ports being arranged in succession, ignition means arranged between each intake port and exhaust port, the ports in one set being angularly spaced a distance of 30° with respect to the similar ports in the other set, pistons and piston rods associated with the cylinders, a crank shaft having a pair of crank pins the said crank pins being angularly displaced with respect to each other a distance of 30°, the piston rods of each set coöperating with one of the crank pins.

5. An internal combustion engine comprising a stator and a rotor, the rotor being mounted upon the stator said stator having a cylindrical surface, a plurality of sets of ports formed in the said surface each of said sets comprising two intake and two exhaust ports the intake and exhaust ports being arranged in succession and the ports of one set being angularly displaced a distance of 30° with respect to the ports of the other set, two sets of cylinders carried by the rotor each of said sets of cylinders comprising three cylinders which are angularly spaced apart a distance of 120°, the cylinders of the two sets being staggered with respect to each other so that in effect the cylinders of the two sets are angularly spaced apart a distance of 60°, pistons and piston rods associated with each set of cylinders, a crank shaft which is mounted in the stator said crank shaft having two crank pins which are angularly spaced apart a distance of 30°, the piston rods of each set coöperating with one of the crank pins, and means operatively connecting the crank shaft and the rotor.

6. An internal combustion engine comprising a stator member and a rotor member said stator member being provided with an annular surface, a plurality of exhaust and intake ports arranged in succession upon the said surface, independent exhaust passageways being formed in opposite portions of the stator and independent intake passageways formed in the stator adjacent the exhaust passageways, said intake passageways traversing a portion of the stator at which the compression firing and expansion of the gas in the cylinders takes place, intake openings formed in the stator communicating with the intake passageways for supplying fuel to the intake ports in the stator, exhaust openings formed in the stator communicating with the exhaust passageways formed in the stator, a cylinder carried by the rotor, the said cylinder coöperating with intake and exhaust passageways in succession during a single revolution, pistons and piston rods associated with the cylinder, a crank shaft with which the piston rods coöperate, and gearing connecting the crank shaft and rotor.

7. An internal combustion engine comprising a stator member and a rotor member, the said stator member being provided with an annular surface, a plurality of sets of ports in said stator each of said sets comprising a plurality of intake and exhaust ports arranged in succession, intake passageways formed in the stator, said intake passageways traversing portions of the stator at which the compression firing and expansion of the gas in the cylinders takes place, said passageways being oppositely disposed in the stator and communicating with the intake passageways and part of exhaust passageways formed in the stator which passageways are oppositely disposed each exhaust passageway being adjacent an intake passageway the said exhaust passageways communicating with certain of the exhaust ports, exhaust openings formed in the stator certain of the exhaust openings communicating with each of the exhaust passageways, a plurality of sets of cylinders carried by the stator each set of cylinders comprising a plurality of cylinders which are symmetrically arranged each set of cylinders coöperating with a set of ports, pistons and piston rods coöperating with the cylinders, a crank shaft said crank shaft having a plurality of crank pins which are out of alinement with each other the piston rods of each set coöperating with one of the crank pins, and gearing connecting the crank shaft and the stator.

8. An internal combustion engine comprising a stator and a rotor member, the said stator member having an annular surface in which are formed two sets of ports each set of ports comprising exhaust and intake ports arranged in succession, the ports of each set being staggered with respect to the ports of the adjacent set, an intake passageway formed in a portion of the stator and communicating with certain intake ports of both sets, and a second intake passageway formed in the stator and communicating with certain intake ports of both sets, each of said intake passageways traversing a portion of the stator at which the gas within the cylinders is compressed, fired and allowed to expand, an exhaust passageway formed in the stator and communicating with certain exhaust ports of both sets, a second exhaust passageway formed in the stator and coöperating with certain exhaust ports of the old sets, a plurality of cylinders carried by the rotor each of which said sets comprising a cylinder which are symmetrically arranged with respect to each other the cylinders of each set being staggered with respect to the cylinders, each set of cylinders coöperating with a set of ports, pistons and piston rods associated with the cylinders, a crank shaft, crank pins, said crank pins being out of alinement with each other, the piston rods of each set coöperating with one of the crank pins, and gearing connecting the crank shaft with the rotor.

9. An internal combustion engine comprising a stator member and a rotor member, the said stator member having an annular surface, an oil conducting conduit formed in the stator and extending transversely thereof there being openings from said oil conduit through to the annular surface of the stator, whereby oil may be supplied to the annular surface of the stator, a second conduit formed in the stator and extending transversely thereof, said conduit being formed at substantially the lower portion of the stator there being openings from the said conduit to the annular surface of the stator whereby excess oil may be collected and conducted from the said annular surface, said rotor comprising an inner member supported upon the stator, a plurality of cylinders the inner ends of which are supported upon the inner member, an annular member which receives and supports the outer end of the cylinders said annular member fitting within the annular surface of the stator, pistons and piston rods associated with the cylinders, a crank shaft with which the said piston rods coöperate, and gearing connecting the crank shaft with the rotor.

In testimony whereof, I hereunto affix my signature in the presence of two witnesses.

PHELPS M. FREER.

Witnesses:
 JOHN H. STEIN,
 GEO. E. GLEDHILL.